United States Patent
Kim et al.

(10) Patent No.: US 7,547,338 B2
(45) Date of Patent: Jun. 16, 2009

(54) MULTI DUST-COLLECTING APPARATUS

(75) Inventors: Min-ha Kim, Gwangju (KR);
Jung-gyun Han, Busan (KR);
Jang-keun Oh, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 536 days.

(21) Appl. No.: 11/317,556

(22) Filed: Dec. 23, 2005

(65) Prior Publication Data

US 2006/0230723 A1    Oct. 19, 2006

Related U.S. Application Data

(60) Provisional application No. 60/666,094, filed on Mar. 29, 2005.

(30) Foreign Application Priority Data

May 9, 2005   (KR) .................. 10-2005-0038323

(51) Int. Cl.
*B01D 45/12* (2006.01)
(52) U.S. Cl. .................. 55/345; 55/346; 55/426; 55/DIG. 3
(58) Field of Classification Search .............. 55/DIG. 3, 55/318, 319, 424, 426, 429, 345, 346
See application file for complete search history.

(56) References Cited

U.S. PATENT DOCUMENTS

| | | | | |
|---|---|---|---|---|
| 1,693,050 A | * | 11/1928 | Proctor | ............ 15/341 |
| 3,364,664 A | * | 1/1968 | De Witt | ............ 55/394 |
| 3,543,325 A | * | 12/1970 | Hamrick | ............ 15/314 |
| 7,343,641 B2 | * | 3/2008 | Shanor | ............ 15/327.2 |
| 2002/0043055 A1 | | 4/2002 | Conrad | ............ 55/337 |
| 2005/0028675 A1 | | 2/2005 | Conrad et al. | ............ 96/57 |

FOREIGN PATENT DOCUMENTS

| | | |
|---|---|---|
| CA | 2445569 | 10/2003 |
| CN | 1593323 A | 3/2005 |
| DE | 10000984 | 7/2001 |
| GB | 238633 | 8/1925 |
| GB | 2406067 | 3/2005 |

(Continued)

OTHER PUBLICATIONS

Official Action dated Apr. 2, 2007 issued from the Russian Federation Patent Office in corresponding Application No. 2006102977/11 (original with translation), 9 pages.
Office Action issued Jun. 15, 2007 in the corresponding Chinese Application No. 200610014315 (original with translation), 9 pages.
Extended European Search Report dated Sep. 19, 2006 issued from the European Patent Office with respect to European Patent Application No. 06290114.5 filed on Jan. 17, 2006.

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A multi dust-collecting apparatus for a vacuum cleaner is provided. The apparatus includes a dust-collecting unit having an air guide member to separate dirt particles from drawn-in air by using a gravity and an inertia and a filter member to remove dirt particles from the discharged air. The apparatus also includes a plurality of cyclones to swirl the air discharged from the dust-collecting unit and separate minute dirt particles from the air by using a centrifugal force.

10 Claims, 3 Drawing Sheets

FOREIGN PATENT DOCUMENTS

| GB | 2406067 A | * | 3/2005 |
| JP | 2003-024827 | | 1/2003 |
| JP | 2003-275150 | | 9/2003 |
| JP | 2004-357767 | | 12/2004 |

* cited by examiner

MULTI DUST-COLLECTING APPARATUS

CROSS REFERENCE TO RELATED APPLICATIONS

This application claims the benefit of U.S. Provisional Application Ser. No. 60/666,094, filed Mar. 29, 2005 and claims benefit under 35 U.S.C. § 119(a) of Korean Patent Application No. 2005-38323, filed May 9, 2005, the entire contents of both of which are incorporated herein by reference.

BACKGROUND OF THE INVENTION

1. Field of the Invention

The present invention relates to a multi dust-collecting apparatus for a vacuum cleaner, and more particularly, to a multi dust-collecting apparatus that separates and collects dirt from air drawn in a vacuum cleaner by taking multi-steps.

2. Description of the Related Art

As is known, a dust-collecting apparatus for a conventional vacuum cleaner uses a dust-bag. However, the dust bag requires replacement when it becomes full and thus causes inconvenience and unpleasantness to a user. In an attempt to solve this problem, so-called cyclone dust-collecting apparatuses separating dirt from drawn-in air by using centrifugal force is being increasingly utilized.

Currently, a multi cyclone dust-collecting apparatus has been suggested to improve a dust-collection efficiency. The multi cyclone dust-collecting apparatus takes at least two steps to centrifugally separate dirt from the drawn-in air. However, the multi cyclone dust-collecting apparatus has a lengthened air flow channel and thus a suction force is lowered.

SUMMARY OF THE INVENTION

The present invention has been developed in order to solve the above problems in the related art. Accordingly, an aspect of the present invention is to provide a multi dust-collecting apparatus that is capable of achieving a high dust-collection efficiency and also maintaining a constant suction force.

The above and other aspects are achieved by providing a multi dust-collecting apparatus including a first dust-collector having a bottom connected with an air suction pipe through which an external air is drawn in, the first dust-collector to separate dirt particles from the air drawn in through the suction pipe using an gravity and an inertia and collect the separated dirt particles therein, a second dust-collector arranged around the first dust-collector to centrifugally separate minute dirt particles from the air drawn in from the first dust-collector and collect the separated minute dirt particles therein, and a cover unit disposed above the first and the second dust-collectors to guide the air discharged from the first dust-collector toward the second dust-collector and discharge the air discharged from the second dust-collector to the outside.

Preferably, but not necessarily, the first dust-collector includes a cylindrical first dust-collecting receptacle having a first inlet connected with the air suction pipe and a first outlet to discharge the air, the first dust-collecting receptacle collecting therein the dirt particles separated from the air, and an air guide member disposed inside the first dust-collecting receptacle and guiding the air drawn in through the first inlet in the direction of an inside surface of the first dust-collecting receptacle such that the dirt particles are separated from the air by the gravity and the inertia.

Preferably, but not necessarily, the air guide member has an arc shape having a predetermined radius of curvature.

Preferably, but not necessarily, the air guide member has an end which has a predetermined height from the bottom of the first dust-collecting receptacle and is disposed away from the inside surface of the first dust-collecting receptacle by a predetermined distance.

Preferably, but not necessarily, an end of the air guide member inclines downwardly and towards the bottom of the first dust-collecting receptacle.

Preferably, but not necessarily, the first dust-collector further includes a filter member disposed at an air flow passage adjacent to the first outlet to remove dirt particles from the air discharged towards the first outlet.

Preferably, but not necessarily, the first dust-collector further includes a dirt movement prevention member protruding from the bottom of the first dust-collecting receptacle to a predetermined height to prevent the dirt particles collected on the bottom of the first dust-collecting receptacle from turning back to the first inlet.

Preferably, but not necessarily, the second dust-collector includes a second dust-collecting receptacle forming an exterior contour of the second dust-collector and collecting the minute dirt particles separated from the air therein, and a plurality of cyclones arranged along an inner circumference of the second dust-collecting receptacle to centrifugally separate the minute dirt particles from the air drawn in from the first dust-collector.

Preferably, but not necessarily, each cyclone includes a cyclone chamber to centrifugally separate the minute dirt particles from the air drawn in from the first dust-collector, a chamber wall disposed between the first dust-collecting receptacle and the second dust-collecting receptacle and forming the cyclone chamber, a second inlet to draw the air discharged from the first dust-collector into the cyclone chamber, and a second outlet to discharge the air separated from the minute dirt particles in the cyclone chamber to the outside.

Preferably, but not necessarily, the cover unit includes a cover, air inflow guide channels fluidly communicating with the first outlet of the first dust-collector and the second inlets of the cyclones, air outflow guide channels fluidly communicating with the second outlets of the cyclones, and an air discharge pipe disposed on the cover to gather the air discharged from the respective air outflow guide channels and discharge the air to the outside.

BRIEF DESCRIPTION OF THE DRAWINGS

These and/or other aspects of the present invention will become apparent and more readily appreciated from the following description of the embodiment, taken in conjunction with the accompanying drawings of which.

DETAILED DESCRIPTION OF AN EXEMPLARY EMBODIMENT

Hereinafter, a multi dust-collecting apparatus according to an embodiment of the present invention will now be described with reference to the accompanying drawings.

Figure 1:
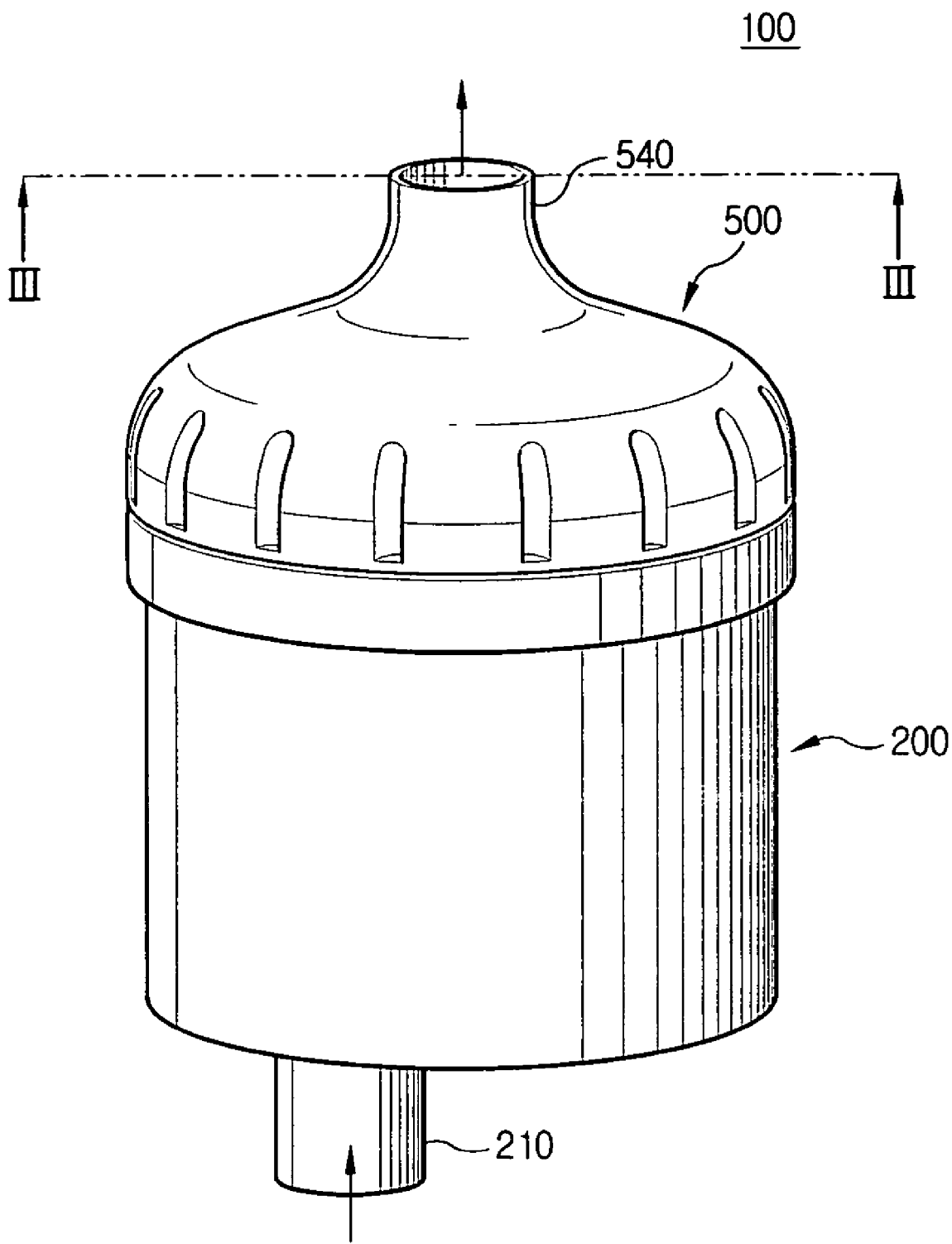
FIG. 1 is a perspective view showing an appearance of a multi dust-collecting apparatus according to an embodiment of the present invention.

Referring to FIG. 1, a multi dust-collecting apparatus 100 comprises a cylindrical dust-collecting unit 200 and a cover unit 500 disposed on an upper portion of the dust-collecting unit 200. An air suction pipe 210 is disposed under the dust-collecting unit 200 to guide an external air toward an inside of a first dust-collector 300 (see FIG. 2) of the dust-collecting unit 200. The dust-collecting unit 200 separates dirt particles from the air drawn in through the air suction pipe 210 and discharges cleaned air. An air discharge pipe 540 is disposed on an upper portion of the cover unit 500 to discharge the air discharged from the dust-collecting unit 200 to the outside of the multi dust-collecting apparatus 100.

Figure 2:
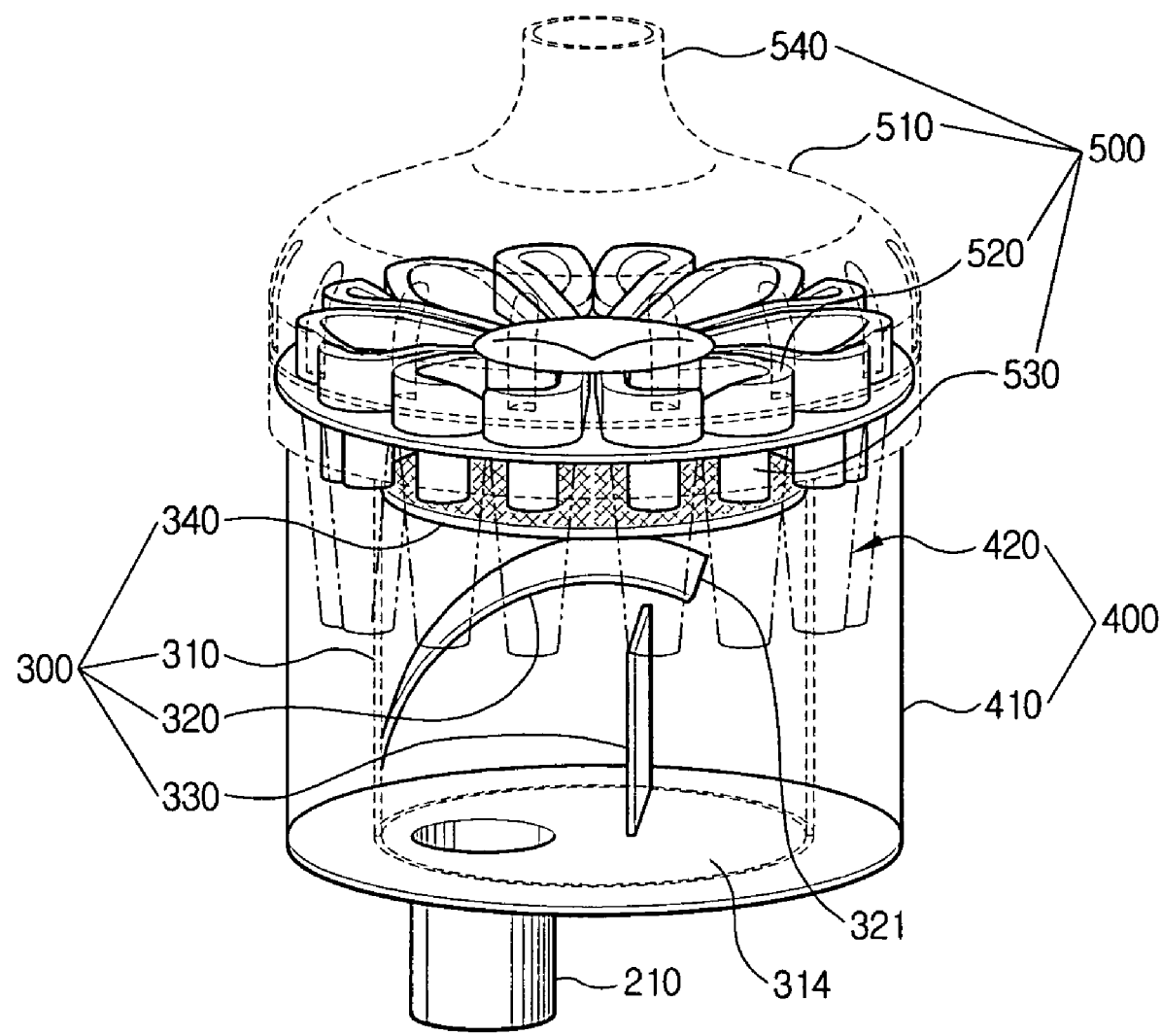
FIG. 2 is a perspective view showing an interior of the multi dust-collecting apparatus of FIG. 1.
Figure 3:
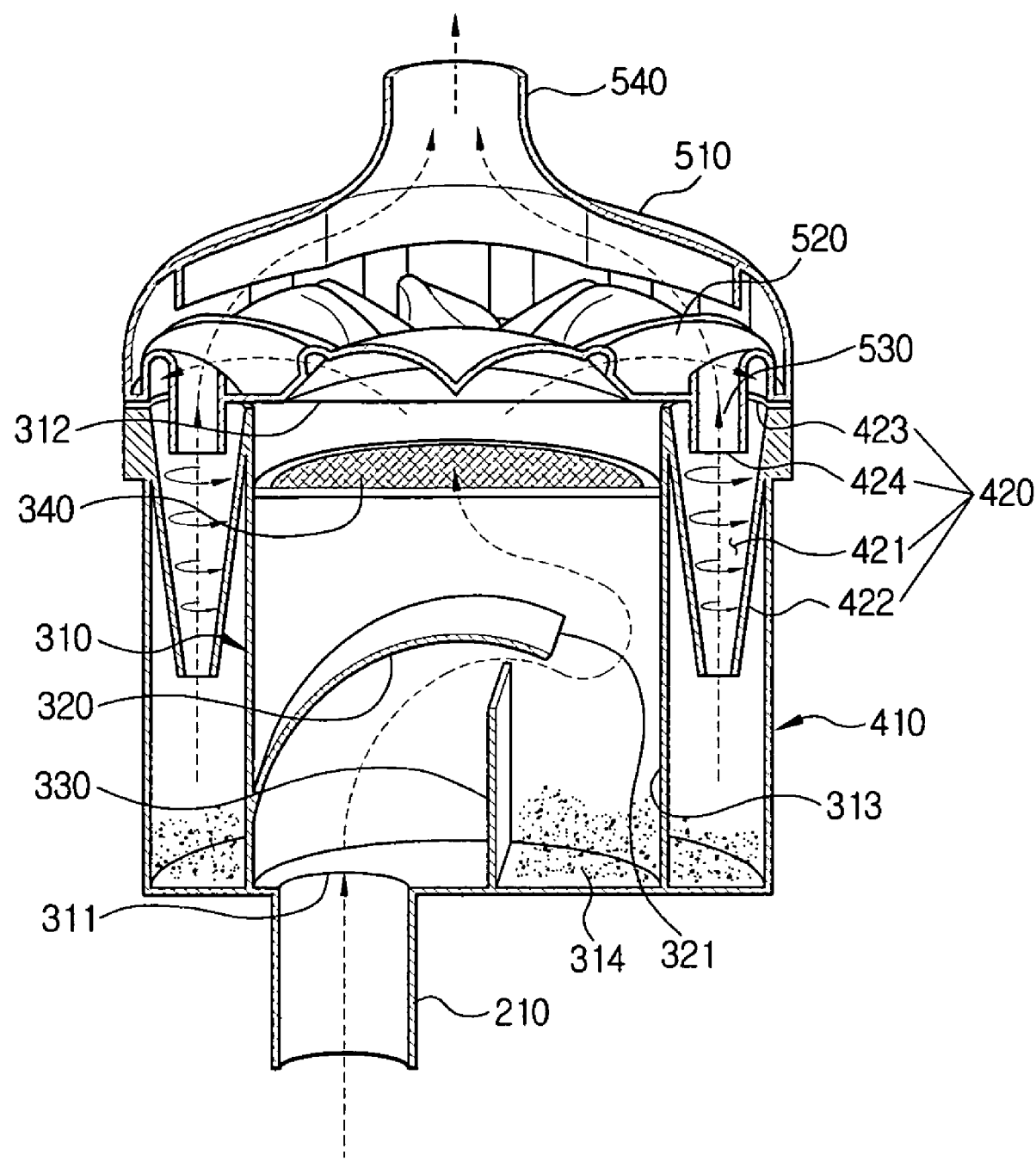
FIG. 3 is a cross section view of FIG. 1 taken along line III-III.

Referring to FIGS. 2 and 3, the dust-collecting unit 200 comprises the first dust-collector 300 to firstly separate dirt particles from the drawn-in air by using gravity and inertia, and a second dust-collector 400 arranged around an outer circumference of the first dust-collector 300 to secondarily separate minute dirt particles which has not yet been separated in the first dust-collector 300 by using centrifugal force.

The first dust-collector 300 comprises a first dust-collecting receptacle 310, an air guide member 320, a dirt movement prevention member 330, and a filter member 340.

The first dust-collecting receptacle 310 forms an exterior contour of the first dust-collector 300 and has a cylindrical shape. The first dust-collecting receptacle 310 has a first inlet 311 formed on a bottom 314 thereof and fluidly communicating with the air suction pipe 210 to draw in the air therethrough. The first dust-collecting receptacle 310 has a first outlet 312 formed on an upper portion thereof to discharge the air. Relatively large and heavy dirt particles included in the air drawn in through the first inlet 311 are filtered in the first dust-collecting receptacle 310 and dirt-removed air is discharged toward the second dust-collector 400 through the first outlet 312. The dirt particles separated out from the air is collected on the bottom 314 of the first dust-collecting receptacle 310. As described above, since the dirt particles are separated out and collected in the first dust-collecting receptacle 310, an extra dirt receptacle is not required. Therefore, a volume of the multi dust-collecting apparatus 100 can be greatly reduced.

The air guide member 320 disposed in the first dust-collecting receptacle 310 guides the air drawn in the first dust-collecting receptacle 310 in the direction of inside surface 313 of the first dust-collecting receptacle 310 and thereby separates the dirt particles from the air by using gravity and inertia. Preferably, the air guide member 320 is shaped in an arc having a predetermined radius of curvature. Because of the air guide member 320, the air drawn in through the first inlet 311 moves in a curve with a less friction and resistance, and thus a pressure loss, which may be caused by an air resistance, is reduced.

The air guide member 320 has an end 321 distanced from the bottom 314 of the first dust-collecting receptacle 310 by a predetermined distance. The end 321 of the air guide member 320 is also distanced from the inside surface 313 of the first dust-collecting receptacle 310 by a predetermined distance. To this end, the air passes between the end 321 of the air guide member 320 and the inside surface 313 of the first dust-collecting receptacle 310.

As described above, the air guide member 320 guides the dirt-laden air towards the inside surface 313 of the first dust-collecting receptacle 310. At this time, the dirt particles collide with the inside surface 313 of the first dust-collecting receptacle 310 and thereby are separated from the air. The end 321 of the air guide member 320 inclines downwardly and towards the bottom 314 of the first dust-collecting receptacle 310. The dirt particles included in the air drawn in the first dust-collecting receptacle 310 have the tendency to keep descending by the gravity and the inertia, and so, descend toward the bottom 314 of the first dust-collecting receptacle 310. On the other hand, the air separated from the dirt ascends due to a suction force of a suction motor (not shown) disposed in a vacuum cleaner (not shown).

As described above, since the dirt particles are separated from the drawn-in air by using gravity and the inertia, the pressure loss can be reduced and also the suction force can be maintained. Also, because the first inlet 311 is formed on the bottom 314 of the first dust-collecting receptacle 310, the direction of the air flow is prevented from abruptly changing, and also there is no limitation to the designing of the multi dust-collecting apparatus 100. For example, a plurality of cyclones may be arranged around the first dust-collector 300 in annular fashion.

The dirt movement prevention member 330 protrudes from the bottom 314 of the first dust-collecting receptacle 310 by a predetermined height. The predetermined height of member 330 is, preferably, lower than the predetermined distance that air guide member 320 is distanced from the bottom 314. The dirt movement prevention member 330 prevents the dirt particles collected on the bottom 314 of the first dust-collecting receptacle 310 from turning back to the first inlet 311.

The filter member 340 is disposed in the first dust-collecting receptacle 310 and on an air passage adjacent to the first outlet 312. The air ascending from the first dust-collecting receptacle 310 passes through the filter member 340 before exiting through the first outlet 312. If some dirt particles are not yet separated from the air by gravity and inertia, they are filtered by the filter member 340. Although the filter member 340 adopts various shapes and materials, it is preferably to adopt a fine mesh member of a simplified plate shape. The plate-shaped filter member 340 prevents the dirt particles from entering the second dust-collector 400, and thus, improves a dust-collection efficiency.

The second dust-collector 400 comprises a cylindrical second dust-collecting receptacle 410 forming an exterior contour of the second dust-collector 400, and a plurality of cyclones 420 arranged along an inner circumference of the second dust-collecting receptacle 410. The plurality of cyclones 420 separate minute dirt particles that have not yet been separated in the first dust-collector 300, and the second dust-collecting receptacle 410 collects therein the dirt particles separated in the respective cyclones 420. Because the second dust-collecting receptacle 410 collects the dirt particles separated in the cyclones 420, no extra dirt receptacle is required. Each cyclone 420 comprises a cyclone chamber 421, a chamber wall forming the cyclone chamber 421, a second inlet 423 and a second outlet 424. The chamber wall 422 has a reverse cone feature having a diameter gradually smaller towards lower end and having a part of the lower end cut off. The air including minute dirt particles descends in the cyclone chambers 421, forming a vortex. The minute dirt particles are separated out by being centrifuged and collected on a bottom of the second dust-collecting receptacle 410. The air discharged from the first dust-collector 300 flows in through the second inlets 423, and the air separated from the minute particles in the cyclone chambers 421 is discharged through the second outlets 424.

The cover unit 500 is disposed above the first and the second dust-collectors 300 and 400, and comprises a cover 510 connected with the second dust-collecting receptacle 410, air inflow guide channels 520, air outflow guide channels 530 and the air discharge pipe 510 disposed above the cover 510. The air inflow guide channels 520 fluidly communicate between the first outlet 312 of the first dust-collector 300 and the second inlets 423 of the cyclones 420, and the air outflow guide channels 530 fluidly communicate with the second outlets 424 of the cyclones 420. The cover 510 may be integrally formed with the air inflow guide channels 520 and the air outflow guide channels 530, or may be fabricated separately from them. The air discharge pipe 540 is disposed above the cover 510 and fluidly communicates with the outlet guide channels 530. The air discharge pipe 540 discharges the air discharged from the cyclones 420 through the air outflow guide channels 530 to the outside of the multi dust-collecting apparatus 100. In this embodiment the air discharge pipe 540 is disposed above the cover 510, but this should not be considered as limiting. It is possible that the air discharge pipe 540 is disposed at a side of the cover 510.

Referring to FIG. 3, operation of the multi dust-collecting apparatus 100 according to an embodiment of the present invention will now be described.

When a power is supplied to the vacuum cleaner (not shown), a suction force is generated. By the suction force, the dirt-laden air is drawn into the first dust-collecting receptacle 310 through the air suction pipe 210 and the first inlet 311.

The air drawn in through the first inlet 311 is guided by the air guide member 320, flows towards the inside surface 313 of the first dust-collecting receptacle 310, ascends to a predetermined height and then descends. At this time, relatively large and heavy dirt particles collide with the inside surface of the first dust-collecting receptacle and are separated from the air by gravity and inertia. The separated dirt particles drop down to the bottom 314 of the first dust-collecting receptacle 310.

The air separated from the large dirt particles ascends and exits from a space between the end 321 of the air guide member 320 and the inside surface 313 of the first dust-collecting receptacle 310. At this time, some dirt particles included in the ascending air is filtered by the filter member 340, and they are stuck to the filter member 340 or drop down to the first dust-collecting receptacle 310.

The air passing through the filter member 340 exits through the first outlet 312 and flows into the plurality of air inflow guide channels 520 of the cover unit 500. The air passing through the air inflow guide channels 520 flows into the respective cyclone chambers 421 through the second inlets 423. Minute dirt particles are centrifugally separated from the air in the cyclone chambers 421 and collected on the bottom of the second dust-collecting receptacle 410.

As described above, the multi dust-collecting apparatus 100 according to the present invention firstly separates and collects the relatively large and heavy dirt particles by using gravity and inertia, and secondarily separates and collects the minute dirt particles by using centrifugal force. Accordingly, compared to a conventional cyclone dust-collecting apparatus using centrifugal force in both the first and secondary separation steps, a pressure loss can be reduced and a suction force can be maintained. Subsequently, a power consumption can be reduced.

Also, since the first and the second dust-collectors 300 and 400 separate the dirt particles from the air and themselves collect the separated dirt particles, no extra dirt receptacle is required. Accordingly, a volume of the multi dust-collecting apparatus is greatly reduced.

Since the filter member 340 is provided in the first dust-collector 300, the dirt particles are prevented from entering the second dust-collector 400. Also, since the plurality of cyclones 420 are provided in the second dust-collector 400, the minute dirt particles-collection efficiency is improved.

Because the first inlet 311 is disposed at the bottom 314 of the first dust-collector 300 to draw in the air therethrough, the designing of the multi dust-collecting apparatus 100 becomes simplified.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi dust-collecting apparatus comprising:
a first dust-collector having a bottom connected with an air suction pipe through which an external air is drawn in, the first dust-collector separating dirt particles from the air drawn in through the air suction pipe using an gravity and an inertia and collecting the separated dirt particles therein;
a second dust-collector arranged around the first dust-collector to centrifugally separate minute dirt particles from the air drawn in from the first dust-collector and collect the separated minute dirt particles therein; and
a cover unit disposed above the first and the second dust-collectors to guide the air discharged from the first dust-collector toward the second dust-collector and discharge the air discharged from the second dust-collector to the outside,
wherein the first dust-collector comprises:
a cylindrical first dust-collecting receptacle having a first inlet connected with the air suction pipe and a first outlet to discharge the air, the first dust-collecting receptacle collecting therein the dirt particles separated from the air;
an air guide member disposed inside the first dust-collecting receptacle and guiding the air drawn in through the first inlet in the direction of an inside surface of the first dust-collecting receptacle such that the dirt particles are separated from the air by the gravity and the inertia; and
a dirt movement prevention member protruding from the bottom of the first dust-collecting receptacle to a predetermined height to prevent the dirt particles collected on the bottom of the first dust-collecting receptacle from turning back to the first inlet.

2. The multi dust-collecting apparatus as claimed in claim 1, wherein the air guide member has an arc shape having a predetermined radius of curvature.

3. The multi dust-collecting apparatus as claimed in claim 2, wherein the air guide member has an end which has a predetermined height from the bottom of the first dust-collecting receptacle and is disposed away from the inside surface of the first dust-collecting receptacle by a predetermined distance.

4. The multi dust-collecting apparatus as claimed in claim 3, wherein the end of the air guide member inclines downwardly and towards the bottom of the first dust-collecting receptacle.

5. The multi dust-collecting apparatus as claimed in claim 1, wherein the first dust-collector further comprises a filter member disposed at an air flow passage adjacent to the first outlet to remove dirt particles from the air discharged towards the first outlet.

6. The multi dust-collecting apparatus as claimed in claim 1, wherein the second dust-collector comprises:

a second dust-collecting receptacle forming an exterior contour of the second dust-collector and collecting the minute dirt particles separated from the air therein; and a plurality of cyclones arranged along an inner circumference of the second dust-collecting receptacle to centrifugally separate the minute dirt particles from the air drawn in from the first dust-collector, wherein each cyclone comprises:

a cyclone chamber to centrifugally separate the minute dirt particles from the air drawn in from the first dust-collector;

a chamber wall disposed between the first dust-collecting receptacle and the second dust-collecting receptacle and forming the cyclone chamber;

a second inlet to draw the air discharged from the first dust-collector into the cyclone chamber; and a second outlet to discharge the air separated from the minute dirt particles in the cyclone chamber to the outside.

7. The multi dust-collecting apparatus as claimed in claim 6, wherein the cover unit comprises:

a cover;

air inflow guide channels fluidly communicating with the first outlet of the first dust-collector and the second inlets of the cyclones;

air outflow guide channels fluidly communicating with the second outlets of the cyclones; and an air discharge pipe disposed on the cover to gather the air discharged from the respective air outflow guide channels and discharge the air to the outside.

8. A multi dust-collecting apparatus comprising:

a dust-collecting unit having an air guide member to separate dirt particles from drawn-in air by using a gravity and an inertia and a filter member to remove dirt particles from the discharged air; and a plurality of cyclones to swirl the air discharged from the dust-collecting unit and separate minute dirt particles from the air by using a centrifugal force, wherein the dust-collecting further comprises a dust-collecting receptacle and a dirt movement prevention member, the dust-collecting receptacle having a bottom for collecting the dirt particles, the bottom being connected with an air suction pipe through which an external air is drawn in, the dirt movement prevention member protruding from the bottom to a predetermined height to prevent the dirt particles collected on the bottom from turning back to the air suction pipe.

9. The multi dust-collecting apparatus as claimed in claim 8, further comprising a cover unit having a guide channel to guide the air discharged from the dust-collecting unit towards the plurality of cyclones and an air discharge pipe to guide the air discharged from the plurality of cyclones to the outside.

10. The multi dust-collecting apparatus as claimed in claim 9, wherein the plurality of cyclones are arranged along the dust-collecting unit.

* * * * *